Nov. 14, 1939.                W. B. SCOTT                2,179,962
       ELECTRIC GENERATING SYSTEM FOR AIRCRAFT AND DOMESTIC SERVICE
                  Filed Nov. 23, 1936        3 Sheets-Sheet 1

William B. Scott,
    INVENTOR.

BY Ralph Douuth

ATTORNEY.

Nov. 14, 1939.   W. B. SCOTT   2,179,962
ELECTRIC GENERATING SYSTEM FOR AIRCRAFT AND DOMESTIC SERVICE
Filed Nov. 23, 1936   3 Sheets-Sheet 2

William B. Scott
INVENTOR.

BY Ralph Daurath

ATTORNEY.

Nov. 14, 1939.  W. B. SCOTT  2,179,962
ELECTRIC GENERATING SYSTEM FOR AIRCRAFT AND DOMESTIC SERVICE
Filed Nov. 23, 1936  3 Sheets-Sheet 3
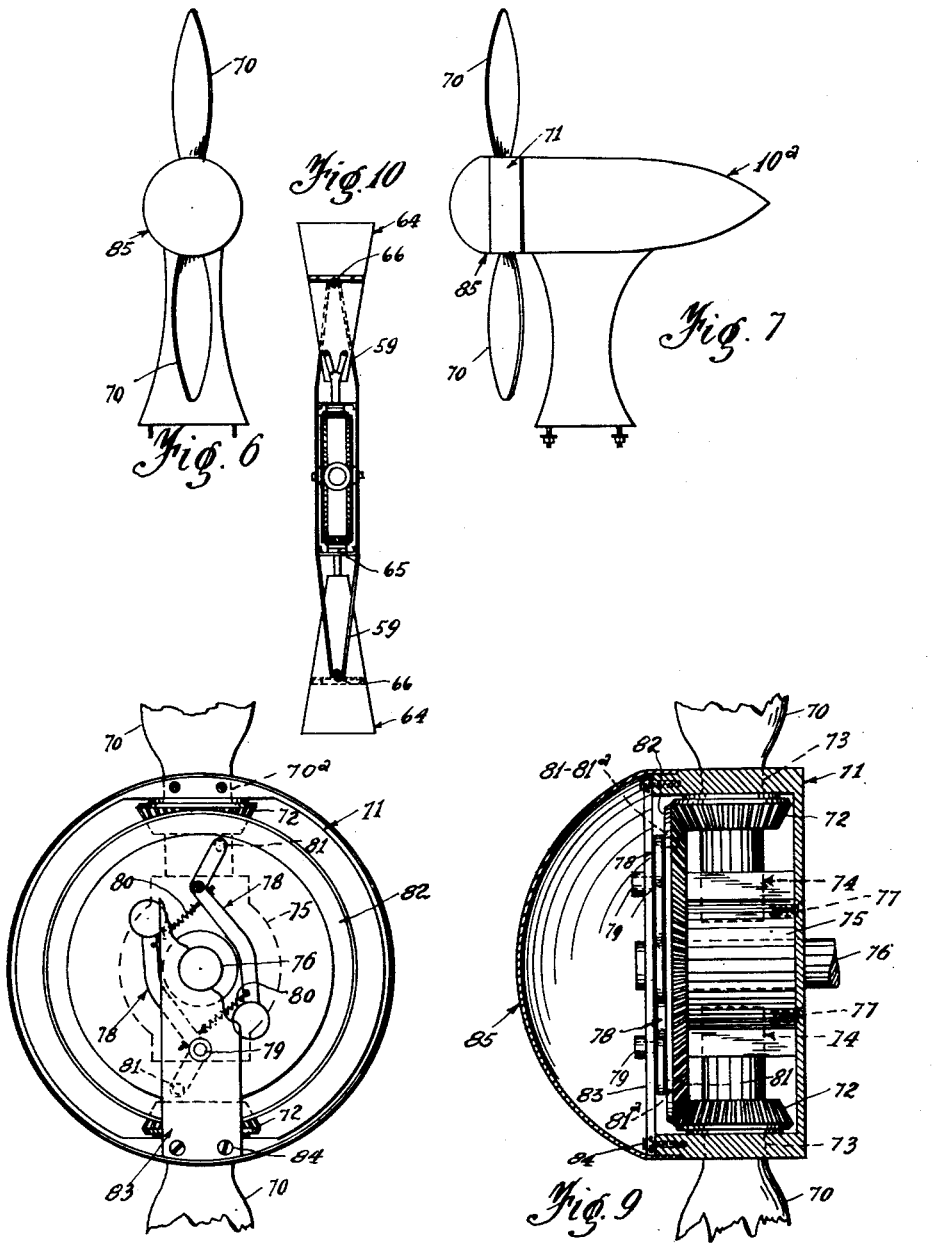
William B. Scott
INVENTOR.
BY Ralph Donath
ATTORNEY.

Patented Nov. 14, 1939

2,179,962

UNITED STATES PATENT OFFICE 2,179,962

ELECTRIC GENERATING SYSTEM FOR AIRCRAFT AND DOMESTIC SERVICE

William B. Scott, Cassoday, Kans.

Application November 23, 1936, Serial No. 112,213

9 Claims. (Cl. 290—44)

This invention relates to generating systems for supplying electric current of constant voltage and, in case of alternating current, constant frequency from wind actuated prime movers provided with blades of adjustable pitch.

One of the primary objects of this invention is to provide a wind actuated power supply for domestic and aircraft use embodying an electric generator of the rotary converter type, whereby said generator will supply alternating current at the prevailing standard voltage for domestic lighting, operating household and farm machinery, as well as for the operation of domestic or aircraft radio-apparatuses, said generator being also adapted to supply direct current for charging storage batteries forming part of the system.

A further object of this invention is to provide an alternating current electric supply which will in turn provide all necessary voltages for radio equipment, together with means for charging the aircraft battery automatically and independent of the aircraft engine.

Another object of this invention is to provide a power system comprising a rotary converter in combination with various relays whereby the direct current portion of the converter may be employed under certain conditions as a motor to actuate the alternating portion thereof.

A further object of this invention is to provide a power generating system which is efficient, relatively simple, inexpensive to manufacture and capable of producing at very low cost direct and alternating current of any desired commercially standardized voltage.

Additional features and advantages of this invention will be more fully described in the following specification considered in connection with the accompanying drawings in which only two specific embodiments of this invention are dealt with, one of which relates to domestic uses and the other to the operation of radio-apparatuses on aircraft.

Referring to the drawings in which like reference characters denote corresponding parts throughout the several views:

Figure 6 is a front elevation of a wind motor for aircraft use.

Figure 7 is a side elevation of Figure 6.

Figure 8 is an enlarged front elevation of the blade feathering mechanism used in the aircraft wind motor.

Figure 9 is a side elevation of Figure 8, partly in section.

Figure 10 is a side elevation of Figure 2 with some of the blades omitted.

If electric energy is wanted in rural homes, which are not within easy reach of central station distributing nets, it is necessary to initially invest a relatively large sum of money for either storage batteries and means of periodically recharging the same, or for the installation of a complete electric generating plant, both systems requiring fuel for their operation and considerable upkeep.

When a conventional storage battery system is used, direct current is available only, usually at 32 volts. If electrical appliances are purchased for this type of power supply, they will usually be more expensive, and sometimes not even available, because they are not standard and thus do not enjoy the low manufacturing cost of mass production. On the other hand, if a complete electric generating plant is installed, the whole of it must be operated regardless of how little power be required, thus greatly reducing the plant's efficiency which, as is well known, is best when the plant operates at nearest the full load for which it is designed.

Figure 1:
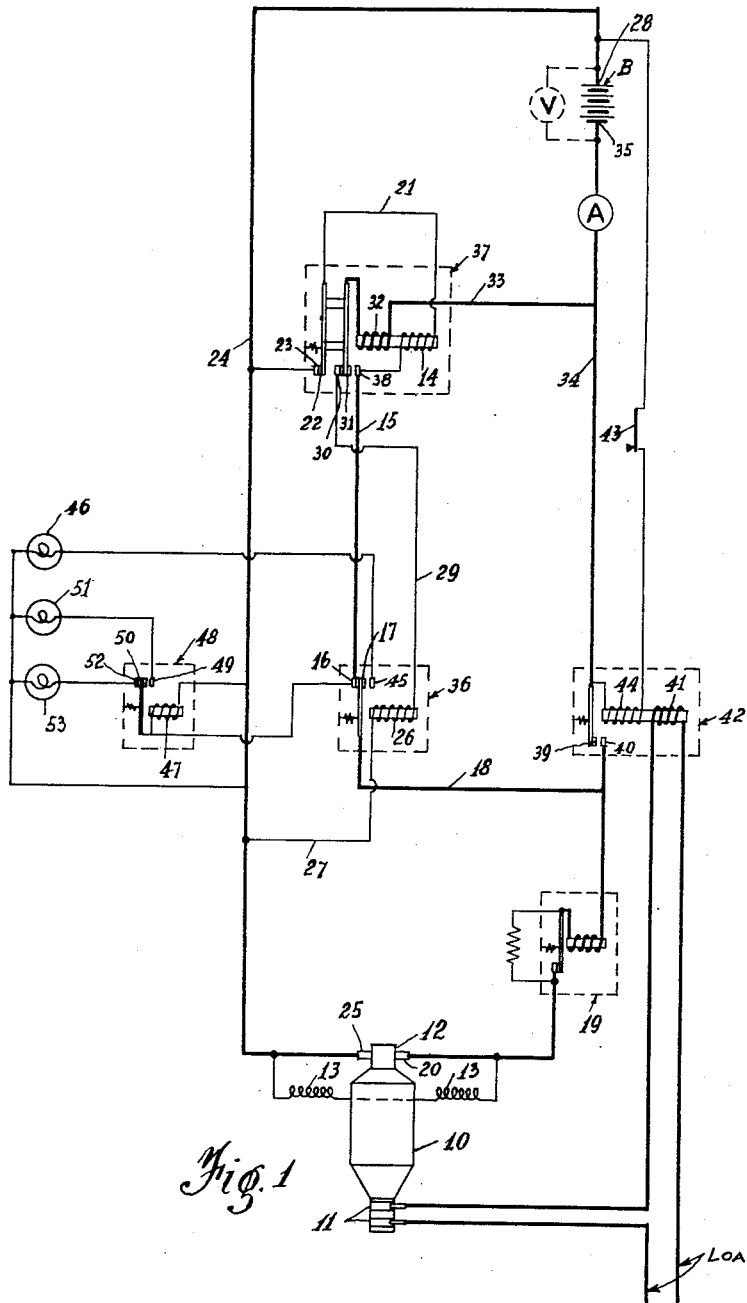
Figure 1 is a diagrammatic view of the various elements, and their electrical connections, included in the present invention.
Figure 2:
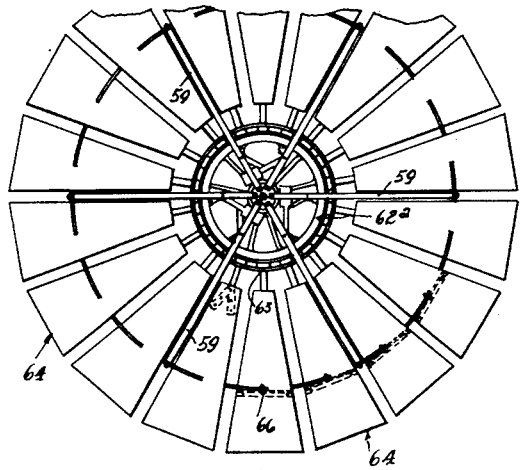
Figure 2 is a front elevation of a windmill, with blades of variable pitch, used in domestic generating systems, especially for outlying farm districts distant from central electric power distributing systems.
Figure 3:
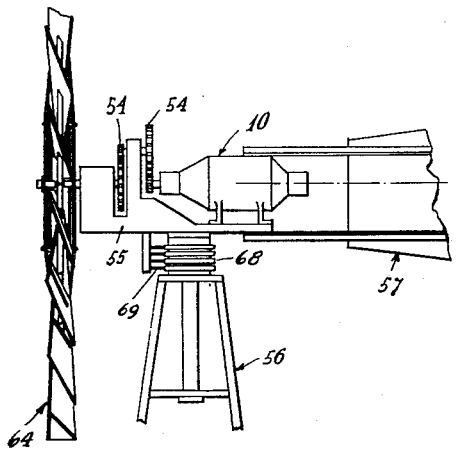
Figure 3 is a side elevation of Figure 2, showing also the driving connections between the windmill and the rotary-converter system.
Figure 4:
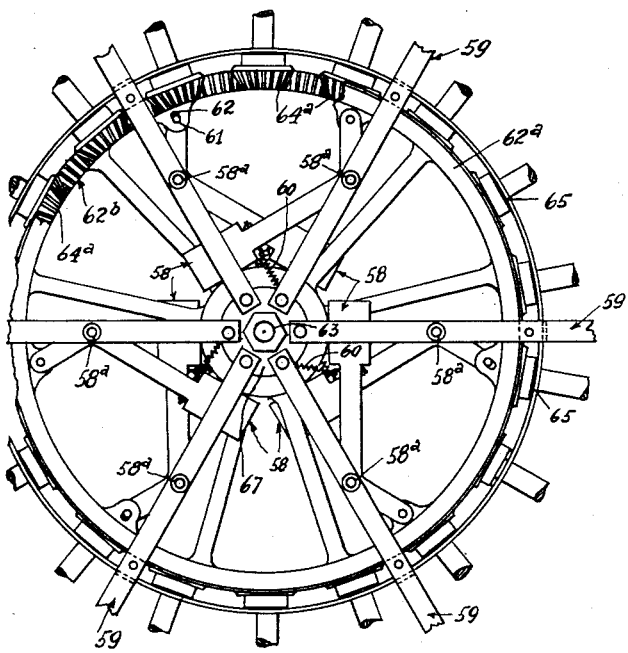
Figure 4 is an enlarged, fragmentary front elevation of the windmill showing the automatic blade feathering mechanism for the windmill.
Figure 5:
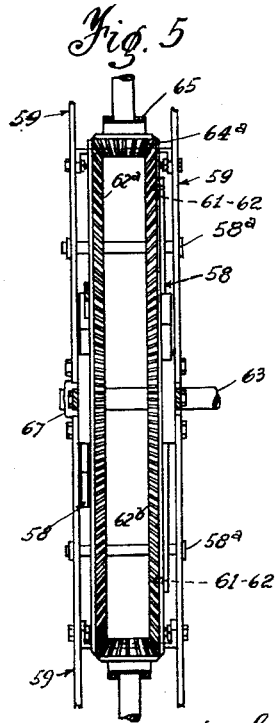
Figure 5 is a simplified side elevation, partly in section, of the blade feathering mechanism, several parts being omitted for the sake of clarity.

This invention embodies a generator of the rotary converter type which is shown diagrammatically as 10 in Figure 1. Whenever the rotary converter is actuated by the windmill an alternating current voltage is delivered through slip-rings 11 and a direct current voltage through the commutator 12. Field 13 receives its excitation through said commutator 12. Relay coil 14 is across the direct current output of the rotary converter through lead 15 contacts 16 and 17, lead 18, overload relay 19 to brush 20 on one side and through lead 21, contacts 22 and 23, lead 24 to brush 25. Relay coil 26 is across the battery B through leads 27 and 24 to terminal 28 of the battery, and through lead 29, contacts 30 and 31, relay coil 32, leads 33 and 34 to terminal 35 of the battery.

Relay 36 is adjusted so that contacts 16 and 17 open at the highest battery voltage and relay 37 is adjusted so that contacts 31 and 38 close when the voltage from the rotary converter is slightly above the highest battery voltage.

It will be seen from the description up to this point that unless the battery B is fully charged relay 36 remains inoperative and contacts 16 and 17 closed. If the wind is turning the rotary converter over fast enough to charge the battery, relay 37 will operate closing contacts 31 and 38. The generated current will then flow through relay coil 32 which will hold contacts 31 and 38 closed, permitting the generated current to charge the battery B. When this relay is in the operative position contacts 22 and 23 remain open preventing relay coil 14 from having any influence over the relay while it is in the operative position. With this arrangement relay 37 can be adjusted to remain closed even in light winds which are just strong enough to overcome the resistance of turning the apparatus over. This is very desirable, particularly in light variable winds, in that the relay would not be continually opening and closing which would result in more wear on the contacts. In addition the light winds will also help to build up the battery charge.

If, while the battery B is charging, either the wind should slow down or the battery should become fully charged the current through relay coil 32 will reduce to a point near zero where it releases the relay arm and opens contacts 31 and 38 preventing any discharge of the battery unless contacts 39 and 40 are closed. When relay 37 releases contacts 30 and 31 will close allowing the battery voltage to energize relay coil 26. The relay 36 with which this coil is associated, is adjusted to operate at the highest battery voltage, so if the battery is fully charged relay 36 will operate, opening contacts 16 and 17, preventing any further charge of the battery until its voltage drops to a predetermined level.

When power is required, if the generator is turning over with the aid of the wind, by applying the load, current will flow through relay coil 41 and cause contacts 39 and 40 to close. This will connect the battery to the direct current portion of the rotary converter, causing it to act as a motor which will assist the wind actuation of the generator in case more power is being consumed at the moment than is being generated by the wind. If, when power is required, the generator is not turning over fast enough to operate relay 42, it can be operated by pushing pushbutton 43 which will cause relay coil 44 to become energized from the battery.

Overload relay 19 is used to protect the rotary converter from heavy charging currents when the battery voltage is low or in strong winds. Its operation being obvious, no description need be given.

For the user of this system it is desirable to know to what extent the battery B is charged. This could be accomplished at a distance from the battery by a voltmeter, but it is thought that at times it will be more desirable to have several small differently colored lights to indicate the degree of charge. In this invention another contact 45 is installed on relay 36 so that when the battery is fully charged and this relay operates, contacts 17 and 45 will close causing lamp 46 to light. When relay 36 is in the inoperative position relay coil 47 will become energized through contacts 16 and 17. If the voltage is above the predetermined level at which relay 48 is adjusted to operate, contacts 49 and 50 will close causing lamp 51 to light. When this relay releases at a predetermined voltage, contacts 50 and 52 will close causing lamp 53 to light.

With this invention the battery will supply the power in low wind velocities and the governor, which turns the edge of the blades into the wind if the wind tends to turn the windmill faster than a predetermined speed, prevents the voltage from going above normal in strong winds.

Referring to Figures 2 to 5 and 10 the rotary converter 10 is connected to the windmill through suitable speed multiplying gears 54 mounted on a suitable frame 55, which is pivoted on top of tower 56 or similar support. The windmill is kept headed into the wind by vane 57. The speed of the windmill is controlled by centrifugal weights 58 pivoted at 58ᵃ on frame 59. These weights are adjusted to move outward against the action of springs 60 at a predetermined speed. As they move outward, projections 61 which are set in sockets 62 on gears 62ᵃ and 62ᵇ turn these gears on shaft 63. The turning of these gears turns the individual blade-gears 64ᵃ, each of which is securely fastened to one of the blades 64. The blade and gear assembly turn in bearings 65 and 66. Hub 67 to which frame 59 is attached is securely fastened to shaft 63. The electrical currents pass through rings 68 and brushes 69, Figure 3.

In the operation of radio apparatuses on aircraft, a high voltage is required for the plates of the radio tubes. It is also desirable that the supply of electricity to the radio apparatuses be independent of the aircraft engine and that the operation of the radio be automatic, so that the pilot may be free for other duties. Moreover, it is obvious that the generating plant for the radio instruments should be as light as possible, to reduce the total weight of an aircraft to a minimum.

Referring to Figures 6 to 9 showing the application of my invention to an aircraft, the streamlined rotary converter 10ᵃ is supported at any desired and suitable place on the aircraft (not shown) to be exposed to the air currents during its flight. The blades 70 are held in a housing 71 by the gear pinions 72 and pivot in the bearings 73 and 74 respectively positioned in the housing and in a central hub 75, keyed or otherwise secured on the shaft 76 of the rotary converter, and to which hub the housing is fastened by means of screws 77.

The speed of the wind motor is controlled by centrifugal weights 78, pivoted in bearings 79 and adjusted to move outwardly against the action of the springs 80, at a predetermined speed. As the weights move outward projections or pins 81, which engage sockets 81ᵃ in the large gear 82, partly turn same about the shaft 76. The turning of gear 82 turns gears 72 which are securely fastened to the shanks 70ᵃ of the blades 70. The bearings 79 for the centrifugal weights are mounted on a support 83 secured to the housing 71 by screws 84. The front of the generator is protected by a cap 85, preferably of the streamlined contour.

The windmotor described for aircraft use may also be adapted to a domestic power plant.

From the foregoing it will be seen that this invention provides an efficient method of producing power of any desired voltage and current for rural homes at minimum cost. Also as applied to aircraft, this invention provides a very efficient and light weight system for operating radio instruments, independently of the aircraft engine, whether the aircraft be on the ground or in the air.

While the invention has been described in particular for domestic and aircraft use, it will be understood by those skilled in the art that the generating apparatus herein set forth is capable of a wide variety of uses, and that various changes may be made in the construction and arrangement of the elements thereof without departing from the scope of the appended claims.

I claim:

1. In a power plant of the character described, the combination of a wind-motor having blades of variable pitch, an electric machine having direct and alternating current windings actuated by said wind-motor, a storage battery charged by the current generated by the direct current portion of said electric machine when actuated by said wind-motor, a relay for electrically connecting said battery to said electric machine when energized by said charging currents at a predetermined voltage, and for electrically disconnecting said battery from said electric machine when charging current reaches zero value, cooperating with a relay to prevent reconnection at such times as the battery may be fully charged.

2. In a power plant of the character described, the combination of a wind-motor having blades of variable pitch, an electric machine having direct and alternating current windings actuated by said wind-motor, a storage battery charged by the current generated by the direct current portion of said electric machine when actuated by said wind-motor, a relay for electrically connecting said battery to said electric machine when energized by said charging currents at a predetermined voltage, and for electrically disconnecting said battery from said electric machine when battery becomes fully charged, through the cooperation of a charge responsive relay.

3. In a power plant of the character described, the combination of a wind-motor having blades of variable pitch, an electric machine having direct and alternating current windings actuated by said wind-motor, a storage battery charged by the current generated by the direct current portion of said electric machine when actuated by said wind-motor, a relay for electrically connecting and disconnecting said battery to and from said electric machine controlled by said charging currents, another relay for electrically isolating said battery from said electric machine when said battery becomes fully charged, the latter relay operated by battery voltage with predetermined setting.

4. In a power plant of the character described, the combination of a wind-motor having blades of variable pitch, an electric machine having direct and alternating current windings actuated by said wind-motor, a storage battery charged by the current generated by the direct current portion of said electric machine when actuated by said wind-motor, a relay for electrically connecting and disconnecting said battery to and from said electric machine controlled by said charging current, a relay for electrically isolating said battery from said electric machine when said battery becomes fully charged, which will automatically reset at a predetermined battery voltage.

5. In a power plant of the character described, the combination of a wind-motor having blades of variable pitch, an electric machine having direct and alternating current windings actuated by said wind-motor, a storage battery, a relay having an electro-magnet in series with load supply to electrically connect said storage battery to said electric machine when energized by the supply load current, to actuate same by said electric machine by current supplied by said battery.

6. In a power plant of the character described, the combination of a wind-motor having blades of variable pitch, an electric machine having direct and alternating current windings actuated by said wind-motor, a storage battery, a relay to electrically connect said storage battery to said electric machine when energized by the supply load current, to assist actuation of same by current supplied by said battery during low wind velocities.

7. In a power plant of the character described, the combination of a wind-motor having blades of variable pitch, an electric machine having direct and alternating current windings actuated by said wind-motor, a storage battery, a relay with an electro-magnet in series with the load supply to electrically disconnect said storage battery from said electric machine when load is removed unless the generated voltage is sufficient to charge said battery.

8. In a power plant of the character described, the combination of a wind-motor having blades of variable pitch, an electric machine having direct and alternating current windings actuated by said wind-motor, a storage battery, a relay to electrically connect and disconnect said storage battery to and from said electric machine controlled by the load supply current, an auxiliary electro-magnet coil attached to the electro-magnet of said relay for electrically connecting said storage battery to said electric machine by means of an electrical pushbutton for starting said wind-motor in calm winds.

9. In a power plant of the character described, the combination of a wind-motor having blades of variable pitch, an electric machine having direct and alternating current windings actuated by said wind-motor, a storage battery, a relay to electrically connect and disconnect said storage battery to and from said electric machine controlled by the load supply current, an auxiliary electro-magnet coil attached to said relay for electrically connecting said storage battery to said electric machine by means of an electric push-button for starting the wind-motor in calm winds, a relay for electrically connecting and disconnecting said battery to and from said electric machine controlled by said charging currents, a relay for electrically isolating said battery from said electric machine when said battery becomes fully charged provided said relay controlled by the load supply current is not operative.

WILLIAM B. SCOTT.